INVENTOR
RONALD EDWARD WRIGHT
BY Kirschstein, Kirschstein & Ottinger
ATTORNEYS

INVENTOR
RONALD EDWARD WRIGHT
BY Kurschstein, Kurschstein & Ottinger
ATTORNEYS

Nov. 27, 1962 R. E. WRIGHT 3,066,286

ARRANGEMENTS FOR PROVIDING A REPRESENTATION IN DIGITAL FORM OF THE RELATIVE POSITION OF A PAIR OF RELATIVELY MOVABLE MEMBERS

Filed Jan. 11, 1960 7 Sheets-Sheet 3

INVENTOR

RONALD EDWARD WRIGHT

BY

Kirschstein, Kirschstein & Ottinger

ATTORNEYS

Nov. 27, 1962 R. E. WRIGHT 3,066,286

ARRANGEMENTS FOR PROVIDING A REPRESENTATION IN DIGITAL FORM OF THE RELATIVE POSITION OF A PAIR OF RELATIVELY MOVABLE MEMBERS

Filed Jan. 11, 1960 7 Sheets-Sheet 4

INVENTOR
RONALD EDWARD WRIGHT
BY Kirschstein, Kirschstein & Ottinger
ATTORNEYS

INVENTOR
Ronald Edward Wright
BY
Kirschstein, Kirschstein + Ottinger
ATTORNEYS

INVENTOR
RONALD EDWARD WRIGHT
BY Kirschstein, Kirschstein & Ottinger
ATTORNEYS

INVENTOR
RONALD EDWARD WRIGHT
BY Kirschstein, Kirschstein & Ottinger
ATTORNEYS 3,066,286

ARRANGEMENTS FOR PROVIDING A REPRESENTATION IN DIGITAL FORM OF THE RELATIVE POSITION OF A PAIR OF RELATIVELY MOVABLE MEMBERS

Ronald Edward Wright, Bushey, England, assignor to The General Electric Company Limited, London, England
Filed Jan. 11, 1960, Ser. No. 1,614
Claims priority, application Great Britain Jan. 12, 1959
13 Claims. (Cl. 340—347)

This invention relates to arrangements for providing a representation in digital form of the relative position of a pair of relatively movable members.

It is an object of the present invention to provide an improved form of such an arrangement.

According to the present invention, in an arrangement for providing a representation in digital form of the relative position of a pair of relatively movable members according to a predetermined code, electrical coding means is arranged to provide either of two different digital representations of the relative position of the members at least when that relative position is in the region of a relative position for which according to said code there is to be a change in the digital representation provided by that coding means, this coding means including electrical switch means arranged to be set to one or the other of two states in dependence upon the actual relative position of the two members, the arrangement being such that in said region the coding means provides one or the other of said two digital representations in dependence upon the state of said switch means at that time whereby the said two different digital representations are provided by the arrangement for relative positions of the pair of members in said region on respective opposite sides of that relative position for which there is to be said change.

The present invention is particularly, though not exclusively, applicable to arrangements for providing a representation in digital form of the relative position of a pair of relatively movable members, wherein coding means is arranged to provide that digital representation in dependence upon the relative position of two portions of that coding means, one of these two portions being mechanically coupled to one of said pair of members in a manner such as to provide for relative movement between those two portions for any relative movement between said pair of members. In previously proposed arrangements of this kind imperfections in the mechanical coupling between said one portion of the coding means and said one of the pair of members, or inaccuracies in the coding means itself have been found sufficient to result in substantial errors in the digital representation.

For example it has been proposed previously to provide a representation in digital form of the angular position of a first shaft by coupling that shaft to a second shaft that forms part of an electrical coder. The two shafts are coupled together through a pair of gear wheels and electric output signals from the coder are at all times characteristic of the angular position of the second shaft. Thus theoretically these output signals are also characteristic of the angular position of the first shaft according to a predetermined code; unfortunately however, the angular position of the second shaft may not be always in correspondence with that of the first shaft. Such a situation may arise, for example, owing to back-lash between the gear wheels coupling the two shafts, and this results in a possibility of error in the output from the coder when taken as representing the actual angular position of the first shaft.

Such an error is most likely to occur when there is an angular displacement of the first shaft for which, according to said code, there is to be a change in the digital representation provided by that coder. During such an angular displacement the resulting angular displacement of the second shaft may lag behind that of the first shaft (so that the two shafts are not then in correspondence) owing to back-lash between the gear wheels. With such a lag the required change in the digital representation does not occur until after the time when (according to the actual angular position of the first shaft) it should occur, and during the interim period the output signals from the coder do not accurately represent the angular position of the first shaft.

In addition to back-lash other imperfections in the gearing and also inaccuracies in the coder itself, may result in similar incorrect representation of the angular position of the first shaft.

Thus there is the disadvantage with this previously proposed arrangement that the digital representation provided by that arrangement does not always correctly represent the angular position of the first shaft according to the predetermined code. This disadvantage may be overcome with an arrangement according to the present invention.

In this case the coding means, in accordance with the present invention, is arranged to provide either of two different digital representations of the angular position of the first shaft when that angular position is in the region of an angular position for which according to the code there is to be a change in the digital representation provided by that coding means, this coding means including electrical switch means arranged to be set to one or the other of two states in dependence upon the actual angular position of the first shaft, and the arrangement being such that in said region the coding means provides one or the other of those two digital representations in dependence upon the state of the switch means at that time whereby those two different digital representations are provided by the arrangement for angular positions of that shaft on respectively opposite sides of that angular position for which there is to be said change.

In an arrangement according to the present invention further coding means may be arranged to provide a representation in digital form of the relative position of said pair of members, it being arranged that digits of this representation and the digits of the representation provided by the first-mentioned coding means are, respectively, lesser and more significant digits of a multi-digit number which is characteristic of the relative position of said pair of members according to said code, and that when the relative position of said pair of members is in said region said first-mentioned coding means provides one or the other of said two digital representations in dependence upon the actual relative position of the two members as this is represented by the digital representation then provided by said further coding means.

The multi-digit number may be an $(m+n)$ digit binary number (where $m$ and $n$ which may be equal, are both integers greater than unity), the digital representation provided by said further coding means being representative of the $(n+1)$ least significant binary digits of said $(m+n)$ digit number, and it may then be arranged that there is a change in the digital representation provided by said first-mentioned coding means, which representation is representative of the $m$ most significant binary digits of the $(m+n)$ digit number, only when there is a change in the most significant binary digit represented by said further coding means.

Two arrangements according to the present invention for providing an electrical representation of a binary number characteristic of the angular position of a shaft, will now be described, by way of example, with reference to the accompanying drawings, in which.

Figure 1:
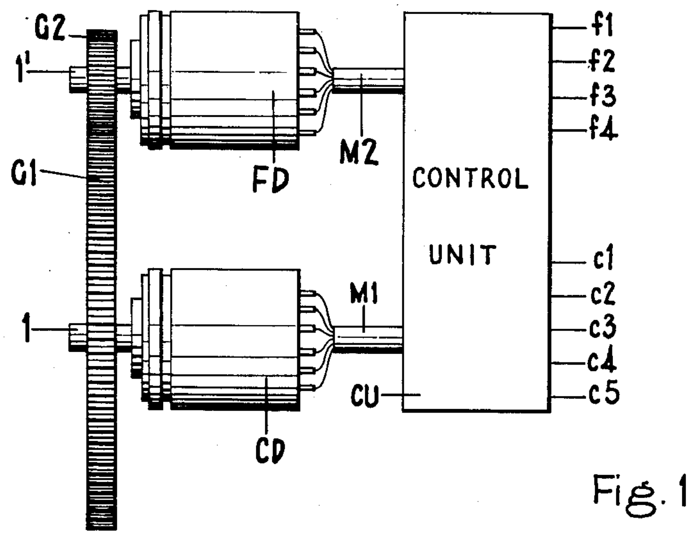
FIGURE 1 shows one of the arrangements.
Figure 7:
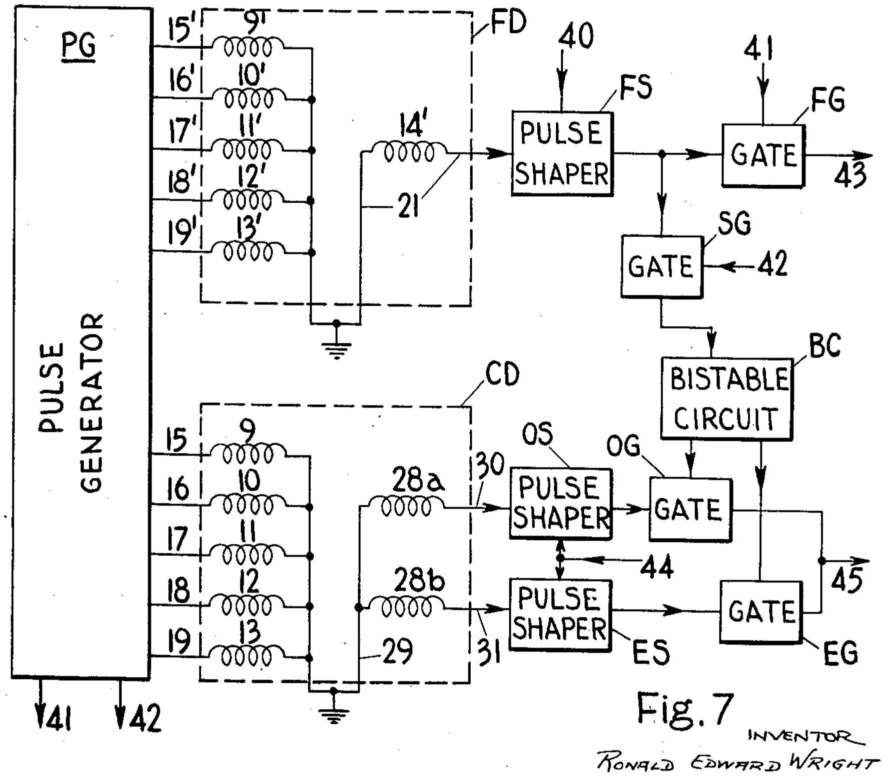
Figure 2:
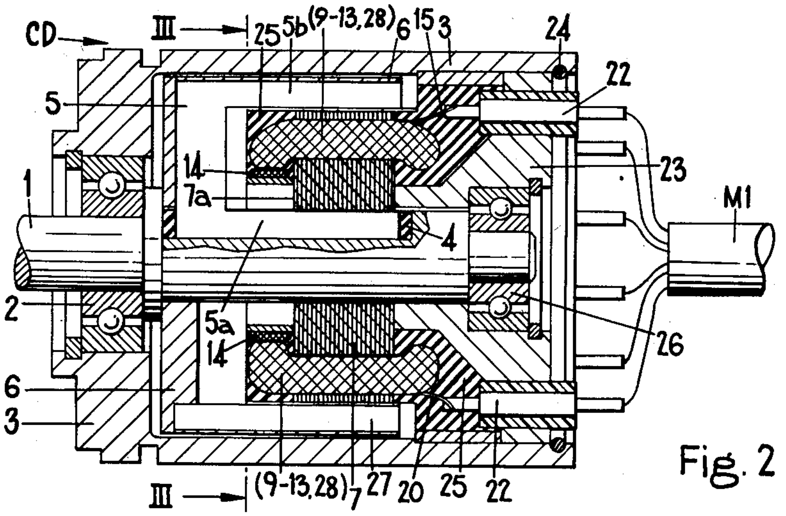
FIGURE 2 is a sectional elevation of one of two coders of the arrangement shown in FIGURE 1.
Figure 4A:
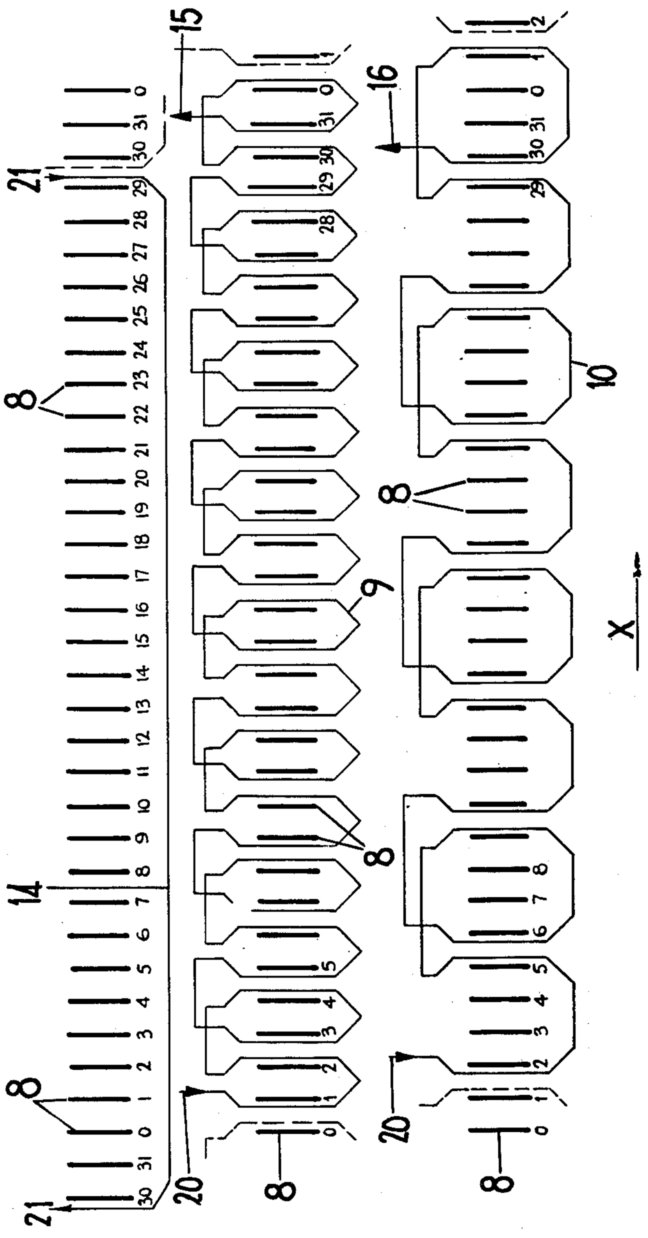
Figure 4B:
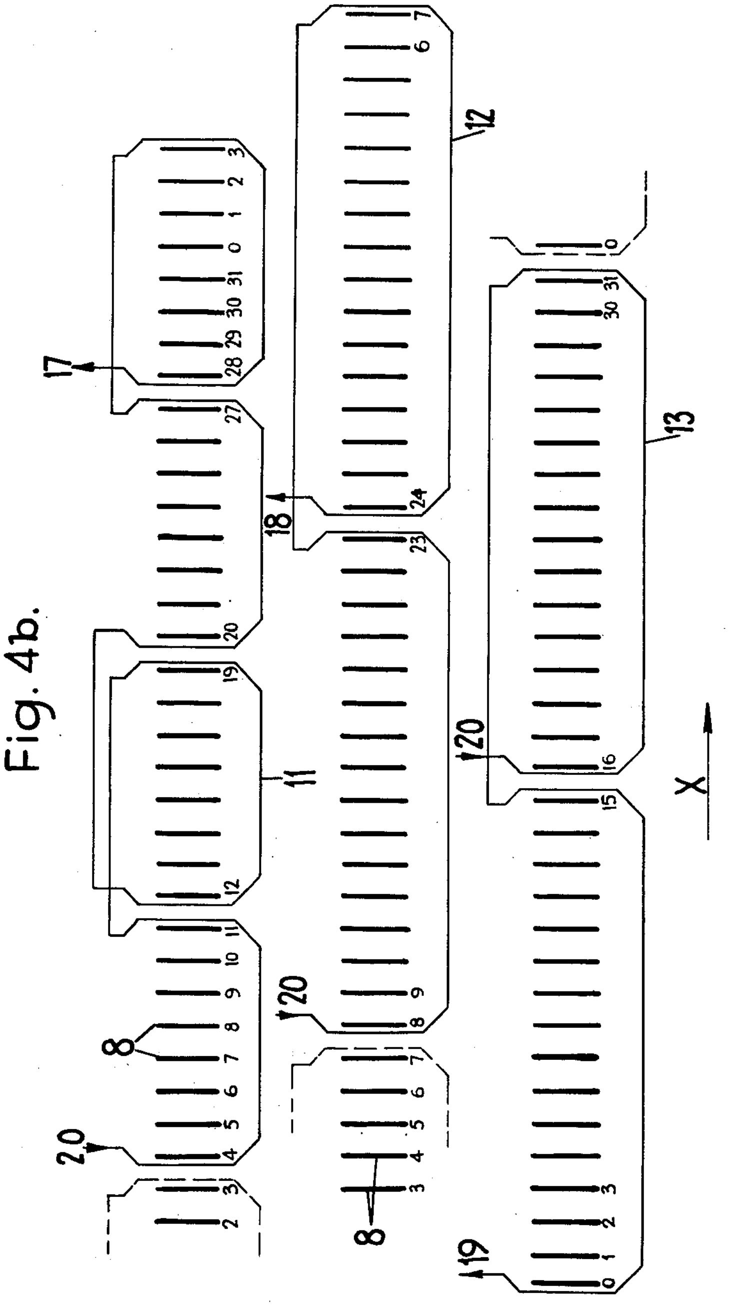
Figure 4C:
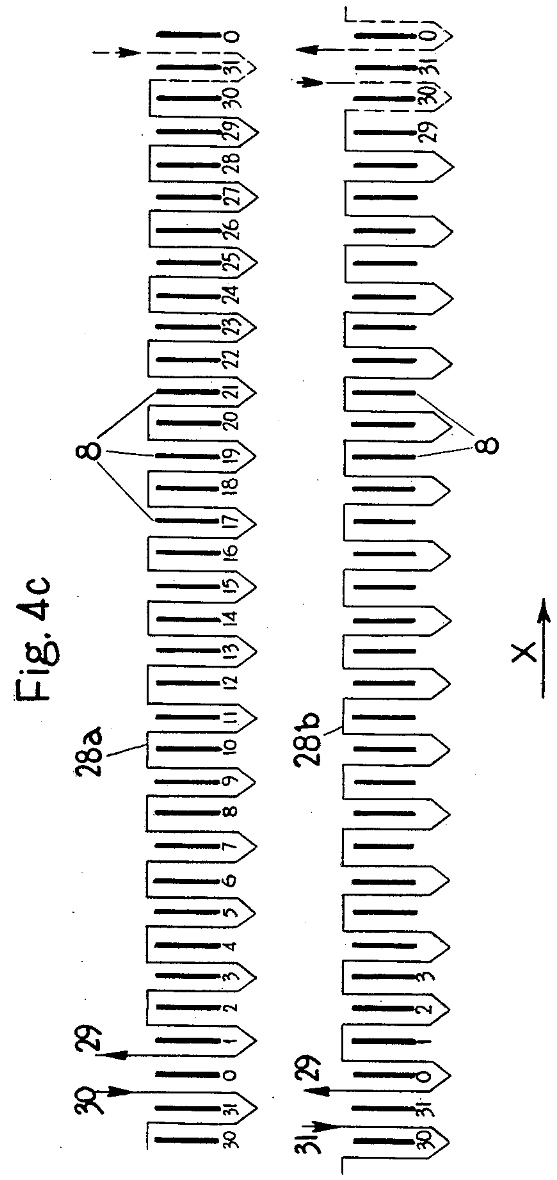
Figure 5:
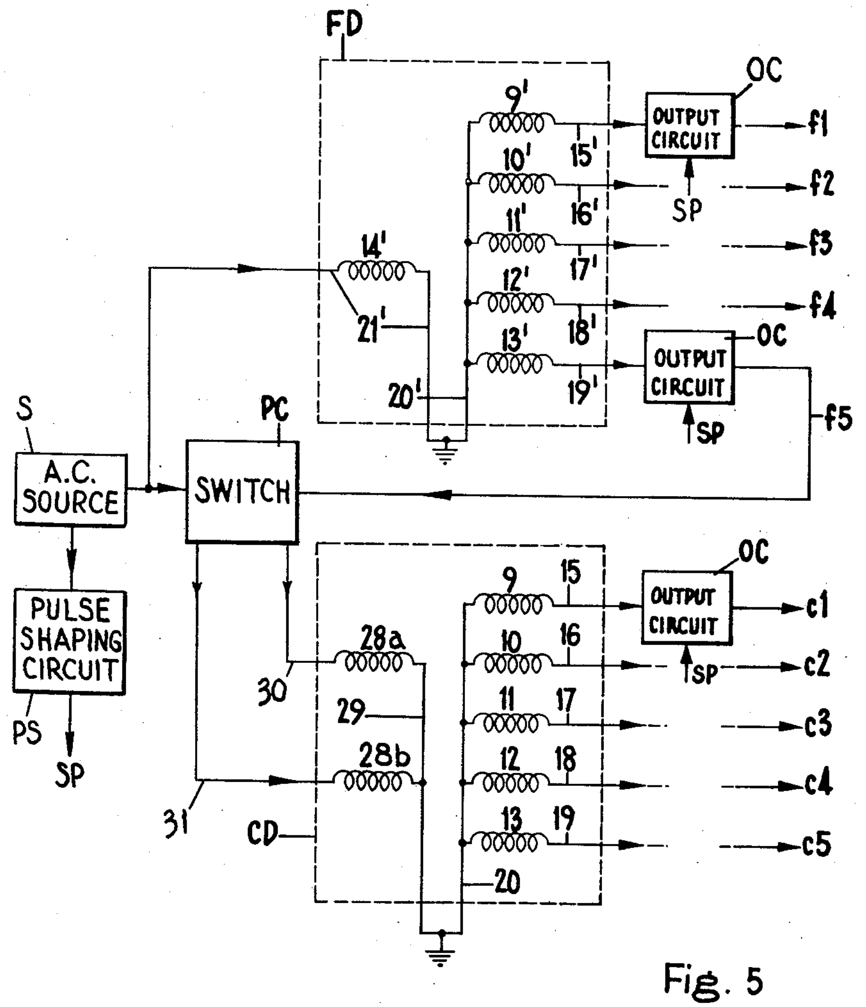
Figure 6:
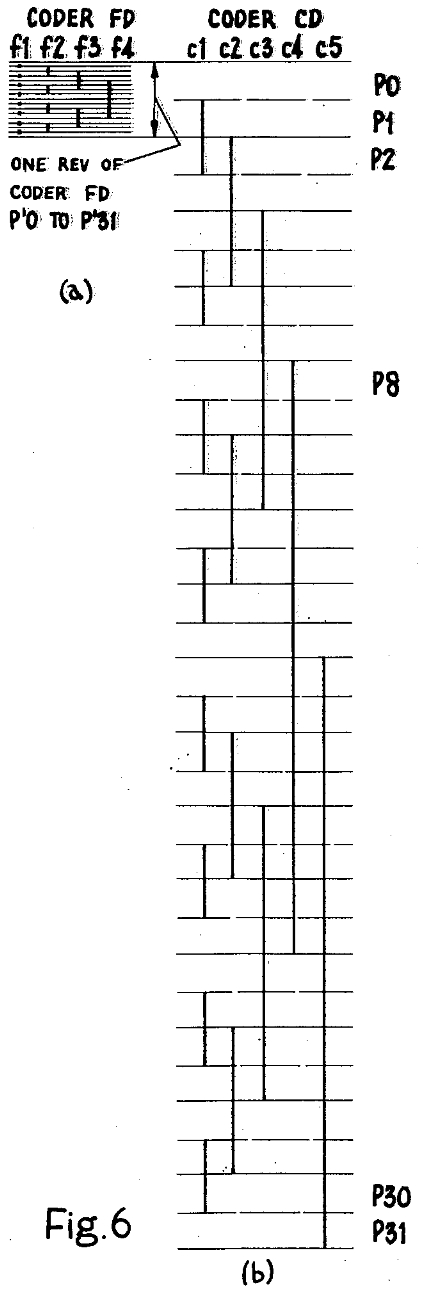

FIGURES 4*a*, 4*b* and 4*c* are diagrammatic representations of the arrangement of electrical windings in the coder shown in FIGURE 2;

FIGURE 5 is a schematic representation of the electrical circuit of the arrangement shown in FIGURE 1;

FIGURE 6 is a diagrammatic representation of the binary code according to which the angular position of a shaft is represented by the arrangement shown in FIGURE 1; and FIGURE 7 is a schematic representation of the electrical circuit of the other arrangement according to the present invention.

Referring to FIGURE 1, the angular position of an input shaft 1′ is represented by this arrangement as a nine digit binary number, and this number is characteristic of that angular position within sixteen complete revolutions of the shaft 1′. The shaft 1′ is, in fact, part of a coder FD and, during use of the arrangement, is connected to a device for rotating that shaft. A shaft 1 of a coder CD is coupled to the shaft 1′ by means of intermeshing gear wheels G1 and G2 secured to the shafts 1 and 1′ respectively. Electrical connection is made between each of the coders CD and FD and a control unit CU by means of respective multi-lead cables M1 and M2.

The control unit CU has nine output leads *f*1 to *f*4 and *c*1 to *c*5, and pulses representative of the nine digits of the binary number then characteristic of the angular position of the shaft 1′, appear on respective output leads *f*1 to *f*4 and *c*1 to *c*5. Pulses representative of the four least significant digits appear, in ascending order of significance, on the leads *f*1 to *f*4, respectively, and pulses representative of the five most significant digits appear, in ascending order of significance, on the leads *c*1 to *c*5 respectively.

In operation an alternating current exciting signal is applied from the control unit CU to the coder CD over a pair of the leads within the cable M1. As a result of this exciting signal five alternating current signals are applied from the coder CD over respective leads of the cable M1, to the control unit CU. The coder CD is such that each of these alternating current signals is either in-phase or in anti-phase with the exciting signal, the particular combination of signals which are in-phase (and consequently the particular combination of signals which are in anti-phase) being characteristic of the angular position of the shaft 1 within one revolution.

Similarly, the alternating current exciting signal is applied from the control unit CU to the coder FD over a pair of the leads within the cable M2. The coder FD is similar in basic construction to the coder CD, so that a combination of five alternating current signals which are either in-phase or in anti-phase with the exciting signal, are applied from the coder FD to the control unit CU. The particular combination of signals which is in-phase (and consequently the particular combination of signals which are in anti-phase) is likewise, characteristic of the angular position of the shaft 1′.

The control unit CU is so arranged that pulses appear on the output leads *c*1 to *c*5 in dependence upon respective ones of the five signals applied to that unit from the coder CD, and also such that pulses appear on the output leads *f*1 to *f*4 in dependence upon respective ones of four of the five signals applied to that unit from the coder FD. A pulse appears on any one of the nine leads *c*1 to *c*5 and *f*1 to *f*4 only while the respective one of the nine signals from the coders CD and FD is in a particular one of the two possible phase relationships, in-phase and in anti-phase, with the exciting signal.

A pulse signal is also derived within the control unit CU from the other signal, the fifth, applied from the coder FD. In fact, as in the case of the other four signals from the coder FD, this pulse signal is derived in dependence upon the phase relationship between the fifth signal and the exciting signal. This pulse signal is used within the unit CU to control the operation of an electronic switch. This switch controls to which of two exciting windings within the coder CD the exciting signal is in fact applied. These two exciting windings are referred to hereinafter as "even" and "odd" exciting windings respectively.

It is arranged that if the fifth signal of the five signals applied from the coder FD to the control unit CU, is in anti-phase with the exciting signal, then the exciting signal is applied to the even exciting winding of the coder CD by the switch. but if that fifth signal is in-phase with the exciting signal, then that further signal is applied to the odd exciting winding by that switch.

The pulses which appear on the output leads *f*1 to *f*4 and *c*1 to *c*5 are in combination representative of a nine digit binary number which is characteristic of the angular position of the shaft 1 according to a nine digit binary code. In accordance with this code the sixteen complete revolutions of the shaft 1′ are divided into thirty-two half revolutions, and each of these half revolutions into sixteen equal angular ranges. The five most significant digits of the represented nine digit binary number indicate in which of the thirty-two half revolutions the shaft 1′ is then positioned, whilst the four least significant digits indicate within which of the sixteen angular ranges of that half revolution the shaft 1′ actually lies.

Although the shaft 1 is geared to the shaft 1′ through the gear wheels G1 and G2, the angular position of the shaft 1 may not be in direct correspondence with that of the shaft 1′ owing to imperfections in the gearing such as, for example, back-lash between those gear wheels. The angular position of the shaft 1 therefore does not provide an accurate representation to the coder CD of the position of the shaft 1′ from which the five most significant digits of the nine digit number may be derived directly by that coder in the ordinary manner. In general however, this inaccuracy is of importance only when the angular position of the shaft 1′ is changed, or is about to be changed, from one to another of the thirty-two half revolutions. Such a change in angular position of the shaft 1′ is to be accompanied according to the nine digit binary code by a change in one of the five most significant digits, and it is essential that this should in fact be obtained in practice irrespective of the imperfections in the gearing and in the coder CD itself.

The desired result is obtained in the present case by arranging that the change in phase of the fifth signal applied to the control unit CU from the coder FD occurs only when the angular position of the shaft 1′ itself is changed from one to the next of the thirty-two half revolutions. It is this change in phase which, by means of the electronic switch, effects the required change in the five most significant digits by changing the exciting winding within the coder CD to which the exciting signal is applied.

Since the change in phase of the fifth signal from the coder FD takes place only at the time when, according to the actual angular position of the shaft 1′ and the nine digit binary code, there should be a change in the five most significant digits, the nine digit binary number represented by the pulse combination appearing on the leads *c*1 to *c*5 and *f*1 to *f*4 provides an accurate indication of the angular position of the shaft 1′. This is so in spite of the fact that part of this pulse combination is derived in dependence upon the angular position of the shaft 1 of the coder CD.

The two coders FD and CD are of the same construction each including three exciting windings—a so-called main exciting winding, an odd exciting winding, and an even exciting winding—of which only the main exciting winding is used in the coder FD and the odd and even exciting windings in the coder CD. In order to explain further the construction of these two coders, the construction of the particular coder CD will now be described with reference to FIGURES 2 and 3.

Figure 3:
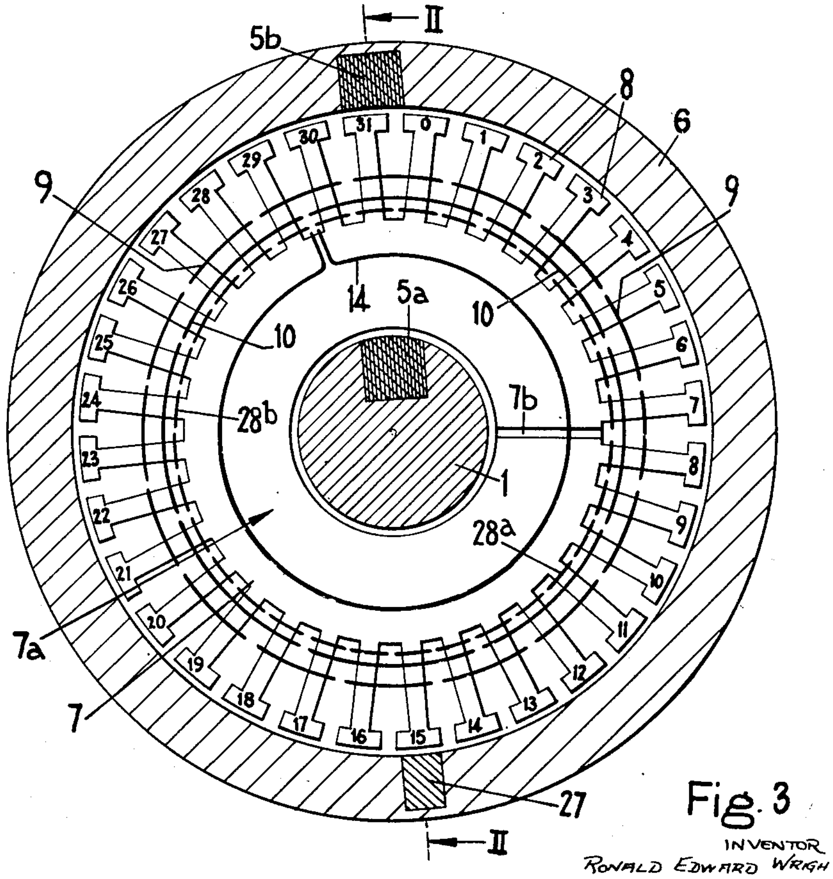
FIGURE 3 is an enlarged diagrammatic representation of a section taken on the line III—III of FIGURE 2, the section of FIGURE 2 being taken on the line II—II of FIGURE 3.

Referring to FIGURES 2 and 3, the shaft 1 is journalled within a bearing 2 housed in a casing 3. The shaft 1 has a channel 4 therein and one limb 5*a* of a laminated ferromagnetic yoke 5 is secured within this channel. Another limb 5*b*, together with the remainder of the yoke 5, is secured within a cylindrical member 6 which rotates with the shaft 1.

A laminated ferromagnetic core 7 is supported within the casing 3, the core 7 having thrity-two teeth 8 (which are numbered 0 to 31 in FIGURE 3). The pitch of the teeth 8 is substantially the same as the thickness of the yoke 5, and the core 7 is composed of seventy laminations. These laminations have respective radial slits 7*b* that are arranged so that throughout the length of the core 7 there is a uniform angular distribution of these slits about the axis of that core.

Five windings 9 to 13 together with odd and even exciting windings 28*a* and 28*b* are wound to lie between adjacent ones of the teeth 8, and over the ends of those teeth at an end 7*a* of the core 7. The windings 9 to 13 and 28*a* and 28*b* have the general reference (9–13, 28) in FIGURE 2, and of these only the windings 9, 10 and 28*a* and 28*b* are shown in FIGURE 3.

A main exciting winding 14 is also associated with the core 7, this winding encircling the shaft 1 at the end 7*a* of the core 7.

Connection is made to the windings 9 to 13 by respective leads 15 to 19 and a common lead 20, to the winding 14 by a pair of leads 21, and to the windings 28*a* and 28*b* by respective leads 30 and 31 and a common lead 29. The leads 15 to 21 and 29 to 31 (of which only the leads 15 and 20 are shown in FIGURE 2) are connected within the coder CD to respective terminal pins 22 which extend from the inside to the outside of that coder. Separate leads of the multi-lead cable M1 are connected to the respective pins 22 on the outside of the coder CD.

The core 7 is supported within the casing 3 by means of an end-member 23 which is secured within the casing by a spring clip 24. The core 7 is in actual fact bonded to the end-member 23 by a resin 25 (such as one of those sold under the registered trademark "Araldite") within which the core 7 and the member 23 are encased during manufacture. The shaft 1 is journalled within a bearing 26 in the member 23.

A lead weight 27 is secured within the member 6 diametrically opposite the limb 5*b* of the yoke 5, in order to counteract unbalance of the shaft 1 caused by the unsymmetrical positioning of the yoke 5 within the member 6.

The manner in which the windings 9 to 14, 28*a* and 28*b*, are wound on the core 7 is indicated diagrammatically in FIGURES 4*a*, 4*b* and 4*c* to which reference will now be made. In these figures the teeth 8 are numbered from 0 to 31 in the same manner as in FIGURE 3.

Referring to FIGURES 4*a*, 4*b* and 4*c*, the winding 9 is wound round pairs of the teeth 8; the winding 10 is wound round groups of four of the teeth 8; the winding 11 is wound round groups of eight of the teeth 8; and the windings 12 and 13 are wound round different groups of sixteen of the teeth 8.

The main exciting winding 14, as also indicated in FIGURE 3, is effectively wound round all the teeth 8 together, whereas the odd and even exciting windings 28*a* and 28*b* are wound round the teeth 8 individually. The odd exciting winding 28*a* is wound round the odd numbered teeth 8, that is Nos. 1, 3, . . ., 29, and 31, and the even exciting winding 28*b* is wound round the even numbered teeth 8, that is Nos. 0, 2, . . ., 28, and 30. These two exciting windings are wound in the same sense on the core 7.

The sense in which each of the windings 9 to 13 is wound onto the core 7 is alternated. For example, the sense in which the winding 9 is wound round Nos. 1 and 2 of the teeth 8 is opposite to that in which it is wound rounds Nos. 3 and 4 of the teeth 8, but is the same as that in which it is wound round Nos. 5 and 6 of those teeth. In addition, the sense in which the winding 11 is wound round Nos. 4 to 11 of the teeth 8 is opposite to that in which it is wound round Nos. 12 to 19 of the teeth 8 but is the same as that in which it is wound round Nos. 20 to 27.

It will be assumed for the purposes of the present description that the senses in which a winding is wound are "positive" and "negative" where that winding (as represented in FIGURE 4*a*, 4*b* or 4*c*) is wound round teeth 8 in anti-clockwise and clockwise directions respectively. In these circumstances therefore, a winding is wound in the "positive" sense where the direction in which that winding is wound over the ends of the teeth 8 at the end 7*a* is as indicated by the arrow X, whereas that winding is wound in the "negative" sense where wound in the opposite direction at the 7*a*. The directions in which the windings are wound are indicated in FIGURES 4*a*, 4*b* and 4*c* by the arrows at the two ends of those respective windings. For example, the winding 9 is wound over Nos. 1 and 2 and Nos. 5 and 6 of the teeth 8 in the positive sense, but in the negative sense over Nos. 3 and 4 of the teeth 8.

Although each of the windings 9 to 14, 28*a* and 28*b* is represented in FIGURES 4*a*, 4*b*, and 4*c* as a single turn, each of the windings 9 to 13 in actual fact comprises twenty-five turns, the windings 14 fifty turns, and each of the windings 28*a* and 28*b* twenty turns.

As stated above the construction of the coder FD is exactly the same as that of the coder CD so that the shaft 1′ (of FIGURE 1) corresponds to the shaft 1 of FIGURES 2 and 3. The windings in the coder FD which correspond to the windings 9 to 14 of the coder CD, and the leads, corresponding to the leads 15 to 21, connected to those windings, are referred to hereinafter as the windings 9′ to 14′, and the leads 15′ to 21′, respectively.

Reference will now be made to FIGURE 5 which represents in block schematic form the control unit CU, and the manner in which this unit is connected to the coders CD and FD.

Referring to FIGURE 5, the alternating current exciting signal, which signal has a frequency of 25 kilocycles per second, is applied to the winding 14′ of the coder FD from a source S, and is also applied through an electronic switch PC to one or the other of the windings 28*a* and 28*b* of the coder CD in dependence upon the state of that switch.

The ten leads 15 to 19 and 15′ to 19′ of the coders CD and FD are connected to ten output circuits OC respectively (of which only three are shown). The leads *f*1 to *f*4 constitute the output leads of the output circuits OC connected to the leads 15′ to 18′, respectively, and the leads *c*1 to *c*5 constitute the output leads of the output circuits OC connected to the leads 15 to 19 respectively. The output circuit OC connected to the lead 19′ of the coder FD, has an output lead *f*5 which is connected, within the control unit CU, to the switch PC.

The exciting signal is also applied from the source S to a pulse shaping circuit PS, and an output lead SP from this circuit PS is connected to each of the output circuits OC (the complete connections between the source S and the output circuits OC have been omitted for clarity).

The effect of the application of the alternating current exciting signal from the source S to the coder CD will now be considered.

Neglecting, for the present, the effect of the yoke 5 upon the operation of the coder CD, the application of the exciting signal to either of the windings **28*a* and 28*b* causes alternating currents to be induced in each of the windings 9 to 13 due to normal inductive coupling between each of the windings 9 to 13 and those exciting windings at the end 7*a* of the core 7. However, as described above, the senses of the windings 9 to 13 alternate round the end 7*a* of the core 7, and for each of the windings the overall inductive coupling between that winding and either of the windings 28*a* and 28*b* is the same in both senses. As a result the alternating currents which are induced in each of the windings 9 to 13 in one sense, are effectively cancelled out by the alternating currents induced therein in the opposite sense, so that no voltage signal is developed between any of the leads 15 to 19, and the common lead 20**.

However, the shaft 1 of the coder CD carries the yoke 5 which is so arranged to complete a magnetic circuit extending through at least one tooth 8 of the core 7 for any angular position of that shaft. The particular position at which this yoke 5 completes the magnetic circuit, and therefore, the particular one of the thirty-two teeth 8 through which that circuit extends, is dependent upon the actual angular position of the shaft 7 relative to the core 7.

The magnetic circuit through the yoke 5 links one or the other of the two exciting windings **28*a* and 28*b* directly to each of the five windings 9 to 13 at the end 7*a* of the core 7, and the sense of the resulting additional inductive coupling between those respective windings 9 to 13 and that exciting winding is dependent upon the sense with which those windings 9 to 13 are wound at the end 7*a*. The particular one of the two exciting windings 28*a* and 28*b* which is linked in this manner to the windings 9 to 13 of course depends upon whether the particular tooth 8 through which the magnetic circuit extends is an even or odd numbered tooth—if it is an odd numbered tooth then the odd exciting winding 28*a* is linked to the windings 9 to 13, but if it is an even numbered tooth then it is the even exciting winding 28*b*** that is so linked.

The resulting signals that appear between the respective leads 15 to 19 and 20 as a result of this additional inductive coupling are thus either in-phase or in anti-phase with the exciting signal in dependence upon the angular position of the yoke 5 with respect to the core 7, and consequently, in dependence upon the angular position of the shaft 1. This phase relationship is also dependent upon to which of the two windings **28*a* and 28*b*** the exciting signal is applied from the switch PC.

The winding 14′ in the coder FD acts effectively as though the two windings **28*a*′ and 28*b*′ were supplied with the exciting signal in parallel. Thus the signals appearing between the respective leads 15′ to 19′ and 20′ are either in-phase or in anti-phase with the exciting signal in dependence solely upon the angular position of the shaft 1′**.

The manner in which the windings 9′ to 13′ are wound (being the same as the windings 9 to 13 of FIGURES 4*a* and 4*b*) is such that there is a unique combination of such "in-phase" and "in anti-phase" signals between the individual leads 15′ to 19′ and the lead 20′, for any angular position of the shaft 1′. Thus, for any angular position of the shaft 1 within a range of 360 degrees, this position is indicated by the unique combination of "in-phase" and "in anti-phase" signals appearing between the leads 15′ to 19′ and the lead 20′.

There is no change in the combination of "in-phase" signals which appear in the windings 9′ to 13′ for angular displacement of the yoke of the coder FD (which yoke corresponds to the yoke 5 of the coder CD) within the angular range of 5.625 degrees on both sides of the centre of any tooth in that coder (corresponding to a tooth 8 in the coder CD). Thus each revolution of that yoke, and consequently, of the shaft 1′ is divided into thirty-two angular ranges of 11.25 degrees centred upon Nos. 0 to 31 of the teeth in the coder FD. These angular ranges centred upon Nos. 0 to 31 of the teeth in this coder will be referred to as the ranges P′0 to P′31 respectively.

The signals appearing on the leads 15′ to 19′ of the coder FD are passed to the associated output circuits OC and are there in effect compared with the exciting signal applied to the winding 14′. The result of this comparison is such that if the signal appearing on a lead of the leads 15′ to 19′ is in one of the two possible phase relationships (in-phase or in anti-phase) with the exciting signal, a pulse appears on the corresponding one of the output leads *f*1 to *f*5. If this signal is in the other of those phase relationships, no pulse appears on that output lead.

In the present case a pulse appears on any one of the leads *f*1 to *f*5 only if an "in-phase" signal appears on the corresponding one of the leads 15′ to 19′.

In operation therefore, the position of the shaft 1′ is indicated by means of a particular combination of pulses appearing on the output leads *f*1 to *f*5, this particular combination being characteristic of the particular one of the ranges P′0 to P′31 then occupied by the shaft 1. The appearance of a pulse on any one of the five output leads *f*1 to *f*5 may be taken as representing the binary digit "1," and the absence of such a pulse the binary digit "0."

From reference to FIGURES 4*a* and 4*b* and considering the output signals that appear upon the leads *f*1 to *f*4 only, the different angular ranges P′0 to P′15 of the shaft 1′ over one half of the complete revolution of the shaft 1′ are represented respectively by sixteen different four digit binary numbers. The angular ranges P′16 to P′31 of the shaft 1′ over the other half of the complete revolution are also represented by the same sixteen four digit binary numbers. However the sequence of sixteen four digit numbers which is obtained for the rotation of the shaft 1′ through the range of angular ranges P′16 to P′31 (in that order) is the reverse of that obtained for rotation of the shaft 1′ through the range of angular ranges P′0 to P′15 (in that order).

Any pulse appearing upon the lead *f*5 is applied to the switch PC. While no pulse is applied over the lead *f*5 the exciting signal from the source S is applied by the switch PC to the even exciting winding **28*b*** in the coder CD, but during the application of a pulse over the lead *f*5 this exciting signal is instead applied by that switch to the odd exciting winding **28*a***.

The application of the exciting signal to either of the exciting windings **28*a* and 28*b* causes alternating currents to be induced in the windings 9 to 13 of the coder CD. The particular phase relationship, in-phase or in anti-phase, between the signal induced in any of these windings 9 to 13 and the exciting signal is dependent, as explained above, upon the angular position of the shaft 1**.

The signals appearing on the leads 15 to 19 are passed to the associated output circuits OC and are there in effect compared with the exciting signal. It is arranged (as in the case of the coder FD) that it is only when an "in-phase" signal appears on one of the leads 15 to 19 that a pulse appears on the associated one of the output leads *c*1 to *c*5.

The shafts 1 and 1′ are coupled together by the gears G1 and G2, which have a gear ratio of 16:1, so that, ideally, the yoke 5 moves from one extreme to the other of an angular range of 11.25 degrees centred upon a tooth 8 for each complete half revolution of the shaft 1′. The thirty-two ranges of 11.25 degrees centred upon Nos. 0 to 31 of the teeth 8, and the corresponding angular ranges of the shaft 1, will be referred to as the ranges P0 to P31.

The initial intercoupling of the two shafts is such that, ideally, the shaft 1 rotates under the action of the gears G1 and G2 from one extreme to the other of the even numbered ranges P0, P2, . . . P28, and P30, for each half revolution of the shaft 1' through the sixteen ranges P'0 to P'15. Consequently the shaft 1, in ideal circumstances, rotates from one extreme to the other of the odd numbered ranges P1, P3, . . . P29, and P31, for each half revolution of the shaft 1' through the sixteen ranges P'16 to P'31.

This ideal correspondence between the position of the two shafts 1 and 1' is not normally obtainable in practice owing to imperfections in the gearing or in the coders themselves. This is of no importance in the present case however, as will now be explained on the assumption that initially the shaft 1 lies within the angular range P0 and that consequently the shaft 1' lies within one of the ranges P'0 to P'15.

While the shaft 1' lies within any of the ranges P'0 to P'15 no pulse is applied over the lead $f5$ from the coder FD and therefore the exciting signal from the source S is applied to the even exciting winding 28$b$ by the switch PC. In these circumstances the same combination of signals, all "in anti-phase" signals, appear in the windings 9 to 13 throughout the angular range P0 of the shaft 1. In fact this same combination of signals would be obtained for any position of the shaft 1 over a range of 5.625 degrees beyond either extremety of the range P0, that is, half-way into either of the two angular ranges P1 and P31. The reason for this is that the even exciting winding 28$b$ is wound round the even numbered teeth 8 so that these are the only teeth that are effective in the coder CD while the exciting signal is applied to the winding 28$b$.

If now the shaft 1' is rotated so as to pass from the angular range P'15 into the angular range P'16 there is a change in phase of the signal induced in the winding 13' of the coder FD. As a result a pulse is now applied to the switch PC, and the switch therefore applies the exciting signal from the source S to the odd exciting winding 28$a$ instead of to the winding 28$b$. When the shaft 1' passes from the range P'15 into the range P'16 the shaft 1 is at least in the region of the transition between the ranges P0 and P1. However before the change in phase of the signal induced in the winding 13' and the consequent switching of the exciting signal from the winding 28$b$ to the winding 28$a$, the combination of signals appearing on the leads 15 to 19 is the same irrespective of the exact position of the shaft 1 in the region of that transition since at this time it is only the even numbered teeth 8 that are effective as explained above.

After the change in phase of the signal induced in the winding 13', it is the odd numbered teeth 8 only that are effective in the coder CD since the exciting signal is then applied to the odd exciting winding 28$a$. In these circumstances the same combination of signals appear in the windings 9 to 13 throughout the angular range P1 of the shaft 1, and in fact are also obtained for any position of the shaft 1 over a range of 5.625 degrees beyond either extremity of the range P1. The signals induced in the windings 10 to 13 in this case are all "in anti-phase" signals whilst the signal induced in the winding 9 is an "in-phase" signal.

Thus, before the change in phase of the signal in the winding 13', the signal induced in the winding 9 is an "in anti-phase" signal, but directly after that phase change the signal induced in the winding 9 is an "in-phase" signal. There is therefore a change in the combination of signals appearing in the windings 9 to 13 for movement of the shaft 1' from the range P'15 into the range P'16, and this change is made irrespective of the actual position of the shaft 1 in the region of the transition between the ranges P0 and P1 at that time.

The binary number represented by the pulses appearing on the leads $c1$ to $c5$ and $f1$ to $f4$ while the shaft 1' is in the angular range P'15 and the shaft 1 is in the angular range P0, is (from reference to FIGURES 4$a$, 4$b$ and 4$c$):

0 0 0 0 0 1 0 0 0 the binary digits being arranged here (and also hereinafter) such that reading from left to right, those digits represent the presence ("1") or absence ("0"), as the case may be, of pulses on the leads $c5$ to $c1$ and $f4$ to $f1$ taken in that order.

On movement of the shaft 1' from the angular range P'15 to the angular range P'16, this binary number changes to:

0 0 0 0 1 1 0 0 0

The change from "0" to "1" of the binary digit in the fifth place of this binary number occurs exactly at the time when the shaft 1' moves from the range P'15 into the range P'16. The fact that the digit in the fifth place of the binary number changes exactly at the time when the shaft 1' moves from the range P'15 into the range P'16, ensures that the binary number provides an unambiguous indication of the position of the shaft 1' irrespective of imperfections (for example back-lash) in the gearing provided by the gears G1 and G2, and inaccuracies in the coder CD.

The same combination of signals appear in the windings 9 to 13 for further rotation of the shaft 1' throughout the angular ranges P'16 to P'31. If, however, the shaft 1' is further rotated to pass from the range P'31 into the range P'0 there is again a change in the phase of the signal induced in the winding 13'. Hence as the shaft 1' passes from the range P'31 into the range P'0 the exciting signal is switched from the odd exciting winding 28$a$ back to the even exciting winding 28$b$. This results in a change in the combination of signals which appear in the windings 9 to 13 of the coder CD, the resultant combination of pulses appearing on the output leads $c1$ to $c5$ and $f1$ to $f4$ after this change being:

0 0 0 1 1 0 0 0 0

From the above example it will be appreciated that for any rotation of the shaft 1' (in either direction) directly between the angular ranges P'0 and P'31 or directly between the angular ranges P'15 and P'16, the exciting signal is switched from one to the other of the two windings 28$a$ and 28$b$. Concurrently with this change there is a resultant change in the combination of pulses which appear on the leads $c1$ to $c5$, so that changes in the five most significant digits of the nine digit number that represents the position of the shaft 1' are directly co-ordinated to changes in position of the shaft 1' itself.

The coding provided by the arrangement described above with reference to FIGURES 1 and 5 is illustrated in FIGURE 6. The signals which appear on the output leads $f1$ to $f4$ of the coder F1 are illustrated at ($a$) of FIGURE 6 for one complete revolution of the shaft 1', whereas the signals which appear on the output leads $c1$ to $c5$ of the coder CD are illustrated at ($b$) of FIGURE 6 for one complete revolution of the shaft 1, that is, for sixteen complete revolutions of the shaft 1'.

In both ($a$) and ($b$) of FIGURE 6 the presence of a pulse is represented by a full line, the sequence of pulses which appear on each of the leads $f1$ to $f4$ and $c1$ to $c5$ for one complete revolution of the shafts 1 and 1' being arranged in columns against the corresponding ranges P'0 to P'31 and P0 to P31. Thus the combination of pulses which appear on the output leads $f1$ to $f4$ and $c1$ to $c5$ for any particular angular range of the shaft 1' and corresponding angular range of the shaft 1, is determined from FIGURE 6 by observing the presence or absence of a full line within the rows of ($a$) and ($b$) appropriate to those particular ranges.

It will be appreciated that if it is required to provide a digital representation of the angular position of the shaft 1' over more than sixteen revolutions, one or more further coders which are the same as the coder CD may be coupled to the shaft 1'. For example, in a case where it is desired to produce a digital representation of the angular position of the shaft 1' over two hundred and fifty six complete revolutions, the shaft of a further coder (not shown) is coupled to the shaft 1 through a gear train having a reduction gear ratio of 16:1. The reduction gear ratio between the shaft of this further coder and the shaft 1' is therefore 256:1, and it is arranged that the further coder is operated so that there is a change in the digits represented by the output from that coder only for a change in the most significant digit represented by the coder CD.

Although with the arrangement of windings in the two coders FD and CD as described above, the angular position of the shaft 1' is represented by a reflected binary cyclic permuted code, the angular position of the shaft 1' may be represented by other codes, for example, by a cyclic binary coded cyclic decimal code. In this latter case only twenty teeth (corresponding to the teeth 8) would be required in each coder FD and CD.

Furthermore, the exciting signals applied to the exciting windings 14, 28*a* and 28*b* of the coders FD and CD may be pulse signals, so that pulses representative of the appropriate digits are obtained directly from the windings 9 to 13 and 9' to 13'.

With the arrangement described above with reference to FIGURES 1 to 5 the digits of the binary number that is characteristic of the angular position of the shaft 1', are obtained in parallel form, the pulses representative of these digits appearing concurrently on the leads *f*1 to *f*4 and *c*1 to *c*5. It may be desirable however that these digits shall be obtained directly in a serial form, and in these circumstances an arrangement as shown in FIGURE 7 may be used. In this arrangement the two coders FD and CD remain coupled together as shown in FIGURE 1, but the construction of the control unit CU of FIGURE 1 is changed as will be apparent from the following description of FIGURE 7.

Referring to FIGURE 7, a pulse generator PG is connected to each of the leads 15' to 19' and 15 to 19 to apply a sequence of ten positive-going pulses to the windings 9' to 13' and 9 to 13. The first five pulses in the sequence are applied to the leads 15' to 19' respectively, and the sixth to tenth pulses are applied to the leads 15 to 19 respectively.

The first five pulses in the sequence, as applied to the windings 9' to 13', cause a train of five pulses to be induced in the winding 14' of the coder FD, the polarity of each pulse in this train being dependent upon the angular position of the shaft 1' at that time. This train of pulses is passed to a pulse-shaper FS so that each of the pulses in that train is suitably shaped, and then amplified, under the control of strobe pulses applied to that pulse-shaper over a lead 40.

The output pulse train from the pulse-shaper FS is applied to each of two gates FG and SG. In these two gates FG and SG the output pulse train is gated with pulses from the pulse generator PG applied over leads 41 and 42 respectively. The first four pulses of the sequence supplied by the generator PG, that is the pulses applied to the leads 15' to 18', are applied to the gate FG over the lead 41, whereas the fifth pulse, that is, the pulse applied to the lead 19', is applied to the gate SG over the lead 42. As a result, the first four output pulses from the pulse-shaper FS are passed by the gate FG to an output lead 43, whereas the fifth output pulse is passed by the gate SG to a bistable circuit BC.

The four pulses appearing in turn upon the lead 43 are representative, in ascending order of significance, of the four least significant digits of the binary number that is characteristic of the angular position of the shaft 1' at that time.

The fifth output pulse is applied from the gate SG to set the bistable circuit BC to adopt one or the other of its two stable states. The particular state adopted by the bistable circuit BC is dependent upon the polarity of this output pulse.

The bistable circuit BC is connected to each of two gates OG and EG to control the passage of pulses through these gates. Pulses are applied to the gates OG and EG from the odd and even windings 28*a* and 28*b* respectively of the coder CD after being suitably shaped, and then amplified, in respective pulse-shapers OS and ES under the control of strobe pulses. These strobe pulses are applied to the pulse-shapers OS and ES over a common lead 44.

A train of five pulses is induced in each of the windings 28*a* and 28*b* during the application of the sixth to tenth pulses from the pulse generator PG to the windings 9 to 13. The polarity of each induced pulse is dependent upon the angular position of the shaft 1 at that time.

The gates OG and EG are controlled by the bistable circuit BC so that only one of the two output pulse trains from the pulse-shapers OS and ES is passed to an output lead 45. The particular one of these two pulse trains which is passed to the output lead 45 is dependent upon the state of the bistable circuit BC at that time and is therefore dependent upon the polarity of the pulse which was last induced in the winding 14' during the fifth pulse of the sequence of pulses from the generator PG. It is arranged that if this pulse induced in the winding 14' is positive-going (that is, is "in-phase" with the pulse applied to the winding 13') the bistable circuit BC is set to the state for which the pulse train from the pulse-shaper OS is passed by the gate OG and the pulse train from the pulse-shaper ES is blocked by the gate EG. On the other hand if the pulse induced in the winding 14' is negative-going (that is, is "in anti-phase" with the pulse applied to the winding 13') the bistable circuit BC is set to the condition for which the pulse train from the pulse-shaper ES is passed by the gate EG and that from the pulse-shaper OS is blocked by the gate OG.

In this manner the train of five pulses which appears upon the output lead 45 is dependent upon the exact position of the shaft 1' as well as upon the position of the shaft 1. It will be appreciated therefore, that the five pulses appearing in turn upon the lead 45 are accurately representative, in ascending order of significance, of the five most significant digits of the nine digit binary number that is then characteristic of the angular position of the shaft 1'. Furthermore it will be appreciated that the two trains of pulses appearing on the separate output leads 43 and 45 may be combined directly to form a single train of nine pulses representing the nine digits of the binary number.

As the pulse induced in the winding 14' of the coder FD during the fifth pulse does not itself contribute directly to the output pulses on the leads 43 and 45, there is an interval corresponding to the duration of the fifth pulse between the appearance of the fourth output pulse on the lead 43 and the first output pulse on the lead 45. Any disadvantage resulting from this may be overcome by introducing a suitable delay in the transmission of each of the four output pulses appearing on the lead 43.

I claim:

1. An arrangement for providing a representation according to a digital code of the relative position of a pair of relatively movable members, comprising: means responsive to said relative position, at least when the relative position is in a region that extends on either side of a datum relative position at which according to the code there is to be a change from a first to a second value in the output representation, to supply a first electric signal when the actual relative position of the members is in said region on one side only of the datum position and to supply a second electric signal when the actual relative position is in said region on the other side only of the datum position; and electrical coding means for supplying output signals that together provide a digital representation according to said code of said relative position, the digital representation having either one of said first and second values when the relative position is in said region in dependence upon which of said first and second signals is supplied by the first said means, the coding means comprising two pairs of electrical windings, a ferromagnetic member inductively to link the windings of both pairs and arranged to be positioned relative to the windings in at least approximate accordance with said actual relative position, means for supplying an electric signal of varying amplitude to excite a first of the two pairs of windings, the windings of the second pair being disposed with respect to the first pair of windings so that the signals that are induced in the second pair in response to the excitation of either winding of the first pair are dependent upon the position of the ferromagnetic member relative to the two pairs of windings, and switch means to establish an operative connection to the two windings of one said pair one at a time, the switch means being responsive to said first and second electric signals to establish said connection to one of the last said windings only in response to said first signal and to establish said connection to the other of the last said windings only in response to said second signal.

2. An arrangement for providing a representation according to an $(m+n)$ digit binary code of the relative position of a pair of members, where $m$ and $n$ which may be equal are both integers greater than unity, comprising: a first electrical position-encoder for supplying $(n+1)$ binary output electric signals that are dependent upon said relative position; a second electrical position-encoder for supplying $m$ binary output electric signals that are dependent upon said relative position, the second position-encoder comprising first and second primary windings, $m$ secondary windings, and a ferromagnetic member for inductively linking the secondary windings to the primary windings and arranged to be positioned relative to the primary and secondary windings in at least approximate dependence upon the actual relative position of said pair of members; means for supplying an exciting signal of varying amplitude; and switch means responsive to the most signifiicant signal of the $(n+1)$ binary output signals of said first position-encoder to apply said exciting signal to the first primary winding only when said most significant signal has a first of its binary values, and to the second primary winding only when said most significant signal has the second binary value; the arrangement being such that the particular one of the two phase relationships, in phase and in anti-phase, which exists between a signal induced in any said secondary winding and the exciting signal, is dependent upon the position of the ferromagnetic member relative to that secondary winding and, at least while the actual relative position of said pair of members is in a region that extends on either side of a datum relative position at which according to said code there is to be a change in the $m$ more significant digits of the output representation of the arrangement, the phase of the signal induced in at least one of the secondary windings is dependent upon which of the two primary windings is then excited so that the $m$ output signals of the second position-encoder and the $n$ lesser significant of the $(n+1)$ output signals of said first position-encoder are together representative of said actual relative position according to said code.

3. An arrangement according to claim 2 wherein the ferromagnetic member is mechanically coupled to one of said pair of members through reduction gearing.

4. An arrangement according to claim 2 wherein said first position-encoder comprises a primary winding connected to be excited by an electric signal of varying amplitude, $(n+1)$ secondary windings, and a ferromagnetic member arranged to be positioned relative to the secondary windings in dependence upon the relative position of said pair of members, the windings in this coder being arranged so that the sense of the overall inductive coupling between each respective secondary winding and the primary winding is dependent upon the position of the ferromagnetic member of this coder relative to that secondary winding, whereby the values of the $(n+1)$ binary signals are each dependent upon which of the two phase relationships, in-phase and in anti-phase, exists between the signal which is induced in a respective one of the $(n+1)$ windings and the exciting signal itself.

5. An arrangement for providing a representation according to an $(m+n)$ digit binary code of the relative position of a pair of members, where $m$ and $n$ which may be equal are both integers greater than unity, comprising: first electrical coding means to provide $(n+1)$ output signals that are representative of the digits respectively of an $(n+1)$ digit number that is characteristic of the relative position of the pair of members; second electrical coding means that has two output leads and is arranged to supply two trains of $m$ output electric signals over the two output leads respectively, the $m$ signals of each train being dependent upon said relative position and being representative of the digits respectively of an $m$ digit number; and electrical switch means that is responsive to that one of said $(n+1)$ output signals that is representative of the most significant digit of the $(n+1)$ digit member to select the train of $m$ signals that is supplied over a first of the two output leads by the second coding means only when said one signal has a first digital value and to select the train of $m$ signals supplied over the second output lead only when said one signal has a second digital value; the arrangement being such that the $m$ digits represented by the $m$ signals of the train that is selected by the switch means in combination with the $n$ lesser significant digits of said $(n+1)$ digit number are representative of said relative position according to said code.

6. An arrangement according to claim 5 wherein said second coding means includes $m$ primary windings connected to be excited in turn by electric pulse signals, two secondary windings connected to apply signals induced therein to the two output leads respectively, and a ferromagnetic member for inductively linking the primary windings and the two secondary windings and arranged to be positioned relative to those primary and secondary windings in dependence upon the relative position of said pair of members, the arrangement being such that the train of pulse signals which is induced in either of the two secondary windings is dependent upon the position of the ferromagnetic member relative to that winding.

7. An arrangement according to claim 6 wherein said first coding means is an electrical coder comprising $(n+1)$ primary windings connected to be excited in turn by electric pulse signals, a secondary winding, and a ferromagnetic member for inductively linking this secondary winding and the $(n+1)$ primary windings and arranged to be positioned relative to those primary windings in dependence upon the relative position of said pair of members, this coder being such that the train of pulse signals which is induced in the secondary winding is representative in digital form of said $(n+1)$ digit binary member.

8. An arrangement for providing a representation according to an $(m+n)$ digit binary code of the relative position of a pair of members, where $m$ and $n$ which may be equal are both integers greater than unity, comprising: a first electrical position-encoder for supplying $(n+1)$ binary output electric signals that are dependent upon said relative position; a second electrical position-encoder to supply two trains of $m$ binary output electric signals that are both dependent upon said relative position, the second position-encoder comprising $m$ primary windings that are connected to be excited in turn by an electric signal of varying amplitude, first and second secondary windings, and a ferromagnetic member for inductively linking the secondary windings to the primary windings and arranged to be positioned relative to the primary and secondary windings in at least approximate accordance with the actual relative position of said pair of members so that the particular one of two phase relationships, in phase and in anti-phase, which exists between a signal induced in any said secondary winding and the exciting signal applied to the primary windings is dependent upon the position of the ferromagnetic member relative to the primary and secondary windings; and a switching arrangement responsive to the most significant signal of the $(n+1)$ binary signals supplied by said first position-encoder to select a train of $m$ signals induced in the first primary winding only when said most significant signal has a first of its binary values and to select a train of $m$ signals induced in the second primary winding only when said most significant signal has the second value; the arrangement being such that at least while the relative position of the pair of members is in a region that extends on either side of a datum relative position at which according to said code there is to be a change in the $m$ more significant digits of the output representation of the arrangement, two trains of signals that are induced in the two primary windings of the second position-encoder are respectively those appropriate to relative positions in said region on opposite sides of said datum position so that the $m$ signals selected by the switching arrangement and the $n$ lesser significant of the $(n+1)$ output signals of said first position-encoder are together representative of said actual relative position according to said code.

9. An arrangement according to claim 8 wherein one of said pair of members is a shaft arranged for rotation relative to the other of said pair of members.

10. An arrangement according to claim 8 wherein said code is a binary code in which successive binary numbers differ in the value of only one digit.

11. An arrangement according to claim 9 wherein the second position-encoder includes a shaft that carries the ferromagnetic member and that is mounted for rotation relative to the primary and secondary windings, and wherein reduction gearing couples the shaft of the second position-encoder to the first said shaft.

12. An arrangement comprising a first electrical coder having a rotatable shaft and arranged to provide $(n+1)$ electric output signals (where $n$ is an integer greater than unity) representative of respective digits of an $(n+1)$ digit binary number that is characteristic of the angular position of the shaft within one revolution, a second electrical coder having a rotatable shaft and two control input paths connected thereto, and being arranged so that while an electric signal is applied over either of the control paths this coder provides $m$ electric output signals (where $m$ which may be equal to $n$, is an integer greater than unity) representative of respective digits of an $m$ digit binary number that is characteristic of the angular position of its shaft within one revolution, gear wheels arranged to intercouple the shafts of the two coders so that the shaft of said second coder is rotated through only a fraction of one revolution for each revolution of the shaft of said first coder, and an electrical switch responsive to that one of the output signals from said first coder which is representative of the most significant digit of said $(n+1)$ digit number to apply an electric signal to said second coder over one or the other of said input paths in dependence upon the value of that digit, the arrangement being such that the $m$ output signals from said second coder are representative according to a predetermined code of the $m$ most significant digits of an $(m+n)$ digit binary number that is characteristic of the angular position of the shaft of said first coder within a plurality of revolutions of that shaft, and that at least while this latter shaft is in the region of an angular position for which according to said code there is to be a change in those $m$ most significant digits said second coder provides output signals that are representative of one or the other of two $m$ digit numbers in dependence upon to which of the two input paths the electric signal is being applied by said switch whereby while the shaft of said first coder is in said region said second coder provides output signals representative of those two $m$ digit numbers for angular positions of that shaft on opposite sides of the angular position for which there is to be said change.

13. An arrangement comprising: a first electrical coder having a rotatable shaft and arranged to supply a train of $(n+1)$ electric output signals, where $n$ is an integer greater than unity, representative of respective digits of an $(n+1)$ digit binary number that is characteristic of the angular position of the shaft within one revolution; a second electrical coder that has a rotatable shaft and two output paths and that is arranged to supply two trains of electric output signals over said two output paths respectively, each train comprising $m$ signals, where $m$ which may be equal to $n$ is an integer greater than unity, that are dependent upon the angular position of the shaft of the second coder within one revolution; gear wheels that intercouple the shafts of the first and second coders to rotate the shaft of said second coder through only a fraction of a revolution for each revolution of the shaft of said first coder; and electrical switching means that is responsive to the most significant signal of the $(n+1)$ output signals from said first coder to select the train of $m$ signals supplied over a first of said two output paths of the second coder only when the said most significant signal has a first of its binary values, and to select the train of $m$ signals supplied over the second of said two output paths only when said most significant signal has the second binary value; the arrangement being such that the $m$ output signals that are selected by said switching means and the $n$ lesser significant of the $(n+1)$ output signals from the first coder are respectively representative according to a predetermined code of the $m$ more significant and the $n$ lesser significant digits of an $(m+n)$ digit binary number that is characteristic of the angular position of the shaft of said first coder within a plurality of revolutions of that shaft.

References Cited in the file of this patent

UNITED STATES PATENTS 2,207,743 Larson ---------------- July 16, 1940